United States Patent
Govyadinov et al.

(10) Patent No.: US 6,891,185 B2
(45) Date of Patent: May 10, 2005

(54) ELECTRONIC DEVICE WITH APERTURE AND WIDE LENS FOR SMALL EMISSION SPOT SIZE

(75) Inventors: Alexander Govyadinov, Corvallis, OR (US); Paul J. Benning, Lesington, MA (US); William R Knight, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/603,445

(22) Filed: Jun. 24, 2003

(65) Prior Publication Data

US 2004/0262592 A1 Dec. 30, 2004

(51) Int. Cl.[7] .......................... H01L 29/06; H01L 29/12
(52) U.S. Cl. ........................................ 257/10; 257/79
(58) Field of Search ..................... 257/10, 79; 313/306, 313/336; 310/309–311

(56) References Cited

U.S. PATENT DOCUMENTS

| | | | |
|---|---|---|---|
| 6,188,167 B1 | * | 2/2001 | Endo et al. .................. 313/309 |
| 6,392,355 B1 | | 5/2002 | Palmer et al. |
| 6,492,781 B2 | | 12/2002 | Palmer et al. |

* cited by examiner

Primary Examiner—Thien F Tran

(57) ABSTRACT

An electronic device of a preferred embodiment includes a tip emitter formed in a well defined in a substrate. An extractor disposed about the well extracts emissions from the tip emitter. A wide lens is spaced apart from the extractor for focusing the emissions through an opening defined the wide lens. The opening has a diameter greater than a diameter of the well. An aperture is disposed between the extractor and the wide lens.

41 Claims, 9 Drawing Sheets

ELECTRONIC DEVICE WITH APERTURE AND WIDE LENS FOR SMALL EMISSION SPOT SIZE

FIELD OF THE INVENTION

The invention is in the microelectronics field. The invention particularly concerns devices making use of focused emissions from emitters.

BACKGROUND OF THE INVENTION

Microprocessor technology continues to evolve competitively, as widely reported in the press. Criticism has been voiced in the trade press, however, about the inability of mass storage devices such as disk drives, CD-ROMs, and DVD drives, to name a few, to keep up with the advancing speed of the microprocessors. Mass storage is viewed as lagging the advances achieved with respect to microprocessors. Particularly, advances in the operational speed and storage capacity of mass storage devices would be welcome.

Electron emitters that create electron beams present the basis for alternative possible solutions for memories, electronic chip fabrication equipment, and other devices. So-called cold cathode electron emitters have attracted the attention of many manufacturers. Several problems exist in converting this cold cathode technology to products. One such problem is the creation of an electron focusing structure that can be used in multiple applications that require a high density of emitting devices such as with mass storage devices.

A typical tip or flat emitter driven memory device is based upon the controlled use of electron emissions from an emitter. An emitter emits electrons in response to an electrical signal. Focused emissions can affect various media to produce, for example, memory and lithography effects. These and other applications require the use of controlled and focused electron beams. Production of such beams involves the fabrication of an emitter and focusing structure, typically an electrostatic lens.

Various emitter driven devices make use of a target anode medium. The target anode medium is the focus point for the controlled emissions. A target anode medium is held at hundreds of volts differential from the emitter/cathode structure. Alignment and focusing length are important issues in emitter driven devices. Fabrication of lenses on emitter chips requires the precise alignment of the emitters and focusing elements. To achieve alignment, standard practice for micro-fabricated emitters is to form the entire lens and emitter structure in a single self-aligned photostep. This achieves good lens/emitter alignment, but limits the distance of the lens from the emitter and also limits the thickness of the lens. Generally, the lens is between one and three times the distance from an extractor as the extractor is from a tip emitter formed in a well. The focusing length is accordingly limited to the short distance afforded by the separation of various metal layers in an emitter/focusing lens chip.

The single self-aligned photostep process further sets the diameter of the lens to that of the well; since both are formed from the same etch. Due to the common size of the extractor and lens and their relative positions, the divergence angle of the emission beam from the emitter is wider than the lens. Small lens diameter additionally generates large spherical aberration and limits minimal spot size. This adversely affects the ability to produce tightly focused spots from the emissions. A tightly focused spot size, e.g., less than 35 nm, is desirable to increase density of a memory and a narrowly diverging beam is desirable for a scientific instrument or a lithography tool. Some laboratory memory devices have achieved bit sizes of about 50 nm and conventional flash memories have bit sizes exceeding 100 nm.

The conventional well housing a tip emitter also is deep. The standard small lens size requires an extremely precise alignment, ~0.04 $\mu$m, between the tip/extractor and lens. As mentioned, a single etch produces the well and lens to achieve the alignment, and aspect ratios of the well are generally high, about 2 to 1 (depth to diameter). This creates processing complexity because it is harder to deposit a tip emitter in a deep well as the coating of the inside of the well is to be avoided while forming the emitter tip. This may require more sophisticated tooling, e.g., larger evaporators. Deep wells can also produce poor emitter tip quality and low yields. There remains a need for an improved electronic device that makes use of focused emissions from emitters.

SUMMARY OF THE INVENTION

An electronic device of a preferred embodiment includes a tip emitter formed in a well defined in a substrate. An extractor disposed about the well extracts emissions from the tip emitter. A wide lens is spaced apart from the extractor for focusing the emissions through an opening defined the wide lens. The opening has a diameter greater than a diameter of the well. An aperture is disposed between the extractor and the wide lens.

DETAILED DESCRIPTION OF THE INVENTION

Figure 1:
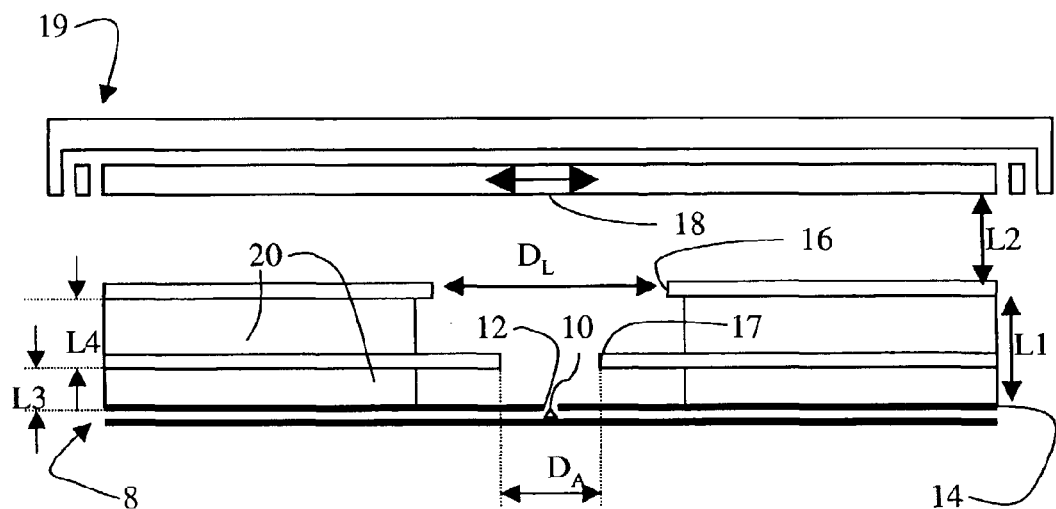
FIG. 1 is a schematic cross section side view of a preferred embodiment electronic device.

A preferred electronic device of the invention will be realized with an aperture and focusing lens formed as structures upon the extractor of an emitter device after the emitter device is formed. Distances and dimensions of the aperture and lens are freed from the constraints implied by self-aligned fabrication processes that form a lens/emitter structure in a single step self-aligned process. The aperture and lens do not have their diameters limited to that of a well for the tip emitter and are also spaced a substantial distance away from the extractor to lengthen the electron flight path compared to conventional devices and permit a single lens to achieve a small focus spot size. An aperture spaced apart from the extractor and before the lens limits divergence of emissions so that emissions are focused in a central part of the lens. In some embodiments, emissions are stabilized, e.g., by controlling voltage variation of the tip emitter. In some embodiments, a collimation is achieved by an extractor level pre-focusing. The use of a separately formed focus lens and separately formed aperture according to the invention permits the relative sizes of the lens and aperture to be determined independently from the size of the extractor/tip well. The various components may also be arranged at desired distances to optimize spot size, e.g., the lens and aperture may be formed on thick dielectric layers to move them away from the extractor. As the emitter and its well are formed first, a small aspect ratio may be used to simply the formation of the tip emitter in its well.

A preferred electronic device of the invention includes an aperture and subsequent focusing lens that are spaced apart from a tip emitter. A depth to diameter aspect ratio for an emitter well may be in the approximate range of 0.75:1–1.25:1 in preferred embodiments, as the spaced apart lens and aperture are formed separately from the emitter and the well may be independently defined. A preferred embodiment has a relationship of the diameter of the lens compared to the distance the lens is spaced apart from the emitter extractor of between 1:1 and 6:1.

The invention will now be illustrated with respect to preferred embodiment electronic devices and representative devices incorporating the preferred embodiment electronic devices. In describing the invention, particular exemplary devices, formation processes, and device applications will be used for purposes of illustration. Dimensions and illustrated devices may be exaggerated for purposes of illustration and understanding of the invention. The elements of the drawings are not necessarily to scale relative to each other. Rather, emphasis has instead been placed upon clearly illustrating the invention. Furthermore, like reference numerals designate corresponding similar though not necessarily exact parts through the several views. A single electronic device illustrated in conventional fashion by a two-dimensional schematic layer structure will be understood by artisans to provide teaching of three-dimensional electronic device structures. Devices and processes of the invention may be carried out with conventional integrated circuit fabrication equipment, as will also be appreciated by artisans.

FIG. 1 illustrates an electronic device of the invention. A substrate 8 includes a tip emitter 10, e.g., a Spindt tip (or a different tip like Si, AlN, and etc.), in a well 12. The substrate 8 may also include additional emitters, and may form part of an integrated device including control electronics, power supplies and the like. The emitter 10 emits electrons under control of an extractor 14. The electron flight path has a substantial length L1 (~2—10 µm or longer) before a wide and distant electrostatic lens 16 focuses the emissions. An aperture 17 spaced apart from the extractor 14 and prior to the lens 16 limits divergence of the emissions into a central part of the lens 16. The lens 16 is wide enough to encompass to accommodate the apertured emissions into a central part of the lens and distant enough to permit the lens 16 to achieve a tight spot focus of emissions unto a medium 18. In preferred embodiments, the target medium 18 is movable relative to the lens/aperture/extractor/emitter structure, for example by a micromover 19 applied to the target medium 18. The micromover 19 acts as a stator and the target medium 18 as a rotor. Exemplary micromovers include, for example, springs, electrostatic, electromagnetic, thermomechanical, piezo, screw and comb micromover assemblies. Alternatively, the mover may be applied to the lens/aperture/extractor/emitter structure.

The target medium 18 can be chosen to create different types of devices. For example, the target medium 18 may be a memory medium with the use of phase change material, an exemplary material being $In_2Se_3$. Irreversible reactions, e.g., the oxidation of a Ti medium, may be useful for write-once memory devices. Other phase change materials are known to those skilled in the art. Another possibility is a lithography application, in which case an electron beam resist material, e.g., polymethylmethacrylate (PMMA), is suitable for the target medium, which may comprise a wafer coated with the electron beam resist material. The target medium 18 is held at a voltage, e.g., 700V, to help accelerate electron emissions toward it.

Preferably, the lens' opening is wide enough to encompass the apertured emissions from the aperture 17 into a central region of the lens 16. The central region avoids fringe fields near the edges of the lens' opening. A diameter $D_L$ in the range of ~2 to ~10 µm is preferred. The ratio of $D_L$ to L1 may fall into a range from above 1:1 to 6:1. The medium 18 is a distance L2, e.g., ~1 to ~20 µm, at the focus point of emissions. The aperture 17 is a distance L3, e.g., ~1—5 µm, from the extractor 14 and a distance L4 from the lens 16, e.g. ~0.7—5 µm. More generally, distances between the aperture 17 and the extractor 14 and the lens 16 and aperture 17 may create an electron flight path (L1) in the range of ~2 µm—10 µm or longer. The aperture 17 has a diameter $D_A$, e.g., ~0.8 µm—2 µm. Very small spot sizes of ~35 nm and smaller, and more preferably to less than ~10 nm may be achieved.

The lens 16 and aperture 17 are formed upon the emitter/extractor structure after the emitter 10 and extractor 14 have been formed. Suitable materials for the electron supply layer 22 (FIG. 2), the extractor 14, the lens 16 and the aperture 17 include any conductors amenable to the fabrication process being employed and the other materials employed. Preferred conductors include TiN, Au, Al, and Ta. Thick dielectric layers 20 achieve the separation between the extractor 14 and aperture 17, and between the aperture 17 and the lens 16. Low stress dielectrics may be used for the layers 20. Preferred examples include TEOS (Si-oxide), $SiN_x$, $SiO_xN_y$, and SiC.

The lens 16 preferably also possesses a substantial thickness to allow sufficient lens power at a lower operating voltage. Depth (vertical thickness) is preferably in the range ~0.1–2 µm but might be made thicker (up to ~10 µm). As lens diameter increases, maintaining lens strength requires an increase in the negative lens voltage. Greater lens diameter lowers aberration and allows decreased spot size, but at the same time greater lens diameter requires more negative lens voltage to keep the same lens' strength. This is potentially inconsistent with the voltage budget (max voltage spec.) of memory devices and might create problems for driving electronics. Increased thickness allows an increase in lens effectiveness at higher lens voltages (more positive with reference to tip potential).

Figure 2:
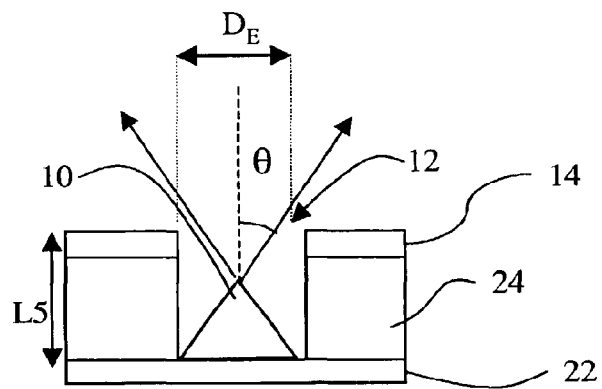
FIG. 2 is a schematic cross section side view of the emitter and well from the FIG. 1 electronic device.

Referring now to FIG. 2, the tip emitter 10 is shown in its well 12. Suitable exemplary tip emitters include tip emitters formed from Mo, Nb, NbC, and Pt. Because the emitter/extractor structure is formed separately from the aperture and the lens, a deep well may be avoided. The well 12 has a depth (L5) to diameter (diameter $D_E$) ratio in the approximate range of 0.75:1–1.25:1, and is preferably 1:1. Formation of tip emitters 10 in the shallow wells, e.g., a ~0.3 μm–~0.5 diameter and ~0.4–~0.6 μm deep well, should increase manufacturing yields compared to processes with the common 2:1 aspect ratio wells that result from the self-aligned formation processes that etch the emitter well in a single step along with the lens opening. In the shallow wells, there is a less of a tendency of tip material to coat walls of the well during formation of the tip. An exemplary preferred embodiment in accordance with FIGS. 1 and 2, has the following parameters: $D_L$ ~4 μm, $D_E$ ~0.4 μm, $D_A$ ~1.5 μm, L2~3 μm, L3~2 μm, L4~3 μm, and L5~0.6 μm. An electron supply metal layer 22 and the extractor metal layer 14 are ~0.1 μm. A dielectric layer 24 separates the electron supply and the extractor metal layer 14.

The emitter/extractor/aperture/lens structure is preferably fabricated with semiconductor device technology. The devices of the present invention are applicable to a broad range of semiconductor devices technologies and can be fabricated from a variety of semiconductor materials. Preferred devices may be implemented in the silicon material systems. Group III–V materials may also be used. Accordingly, the present invention is not intended to be limited to those devices fabricated in silicon semiconductor materials, but will include those devices fabricated in one or more of the available semiconductor materials and technologies available to those skilled in the art. Without intending to limit the invention, another example is the thin-film-transistor (TFT) technology using polysilicon on glass substrates.

Figure 3:
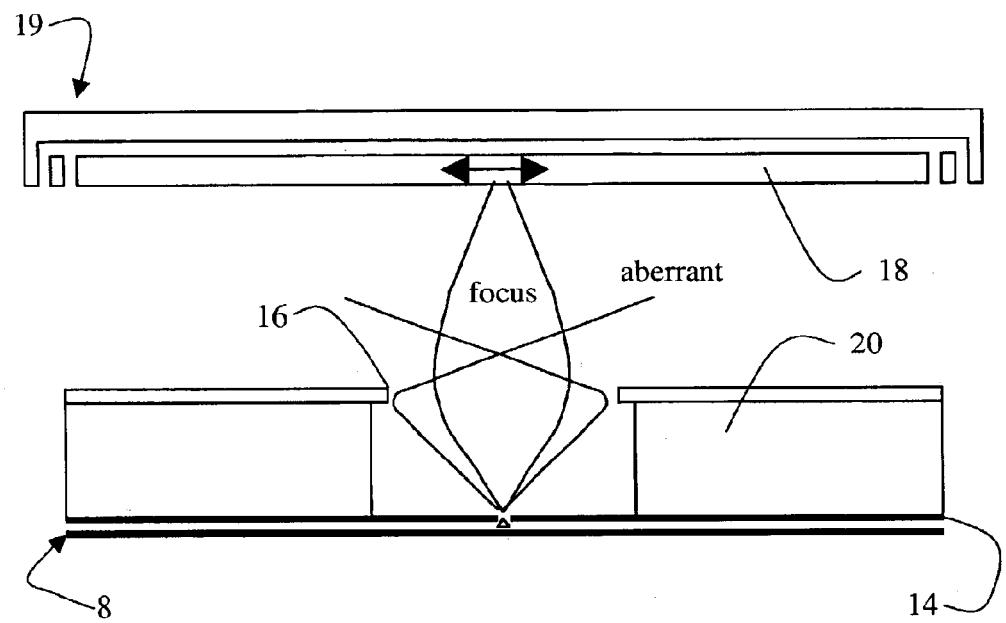
FIG. 3 is a schematic cross section side view of an electronic device lacking the aperture of FIG. 1 and showing a focusing effect due to aberrant fields near lens opening's edges.

A divergence angle θ of emission is shown in FIG. 2. The distance and diameter of the aperture 17 and the lens 16 are such that the aperture limits emissions to a central portion of the lens 16. Referring to FIG. 3 (which shows a structure lacking an aperture 17), the field created near the edge of the lens' opening will not focus electrons. With the invention, the aperture to limit the emissions to a central part of the lens away from the field created near the edge of the lens' opening will achieve a focus, for example, to a spot size at least as small as ~35 nm, and preferably optimized to ~10 nm. Moving emissions away from the edge regions of the lens 16 by use of a wide and distant lens and aperture reduces or eliminates the unfocused aberrant emissions that occur from electron flight paths near the lens' edge.

Figure 4A:
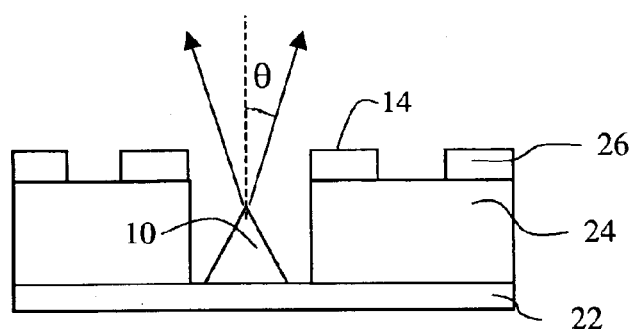
FIG. 4A is a partial schematic cross section side view of a preferred embodiment electronic device.
Figure 4B:
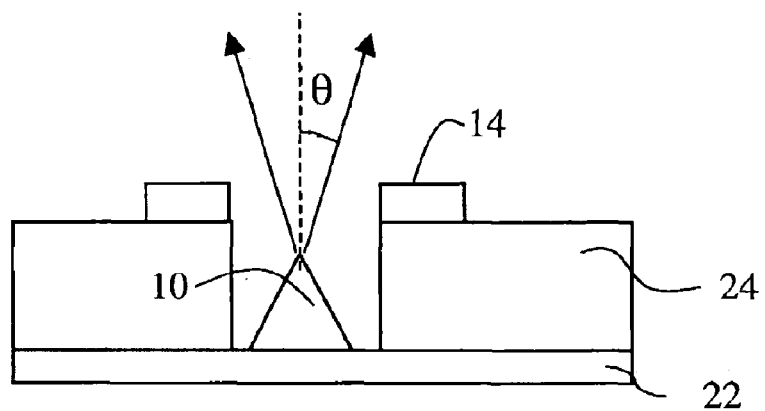
FIG. 4B is a partial schematic cross section side view of a preferred embodiment electronic device.

The goal of small spot size is furthered by additional preferred aspects of the invention, as illustrated in embodiments of the invention respectively shown in FIGS. 4A and 4B. FIGS. 4A and 4B are partial views otherwise consistent with the FIG. 1 embodiment though not all features are shown in FIGS. 4A and 4B. FIG. 4A illustrates a preferred method to narrow the angle of divergence by adding an extractor level focusing electrode 26 and/or forming the extractor 14 as a circular electrode about the well 12. In FIG. 4B, the electrode 26 is omitted, while the extractor 14 is also formed as a circular electrode about the well. The width of the circular electrode forming the extractor 14 is small enough for the extractor to act as a lens, an effect that takes advantage of the fringe field effect of the plane formed by the electron supply layer 22. The lens effect of the circular electrode forming the extractor 14 is increased for smaller width electrodes and decreases eventually to effectively zero when the circular electrode is made wider. In FIG. 4A, the electrode 26 forms a negatively biased collimating lens having a diameter, e.g., ~2 μm–~3 μm, and further limits the divergence angle to increase the percentage of emissions that are apertured and focused. In FIG. 4B, The electrode 26 is isolated from the circular electrode forming the extractor 14 by being spaced away from the extractor 14, for example by portions of dielectric 20.

Figure 4C:
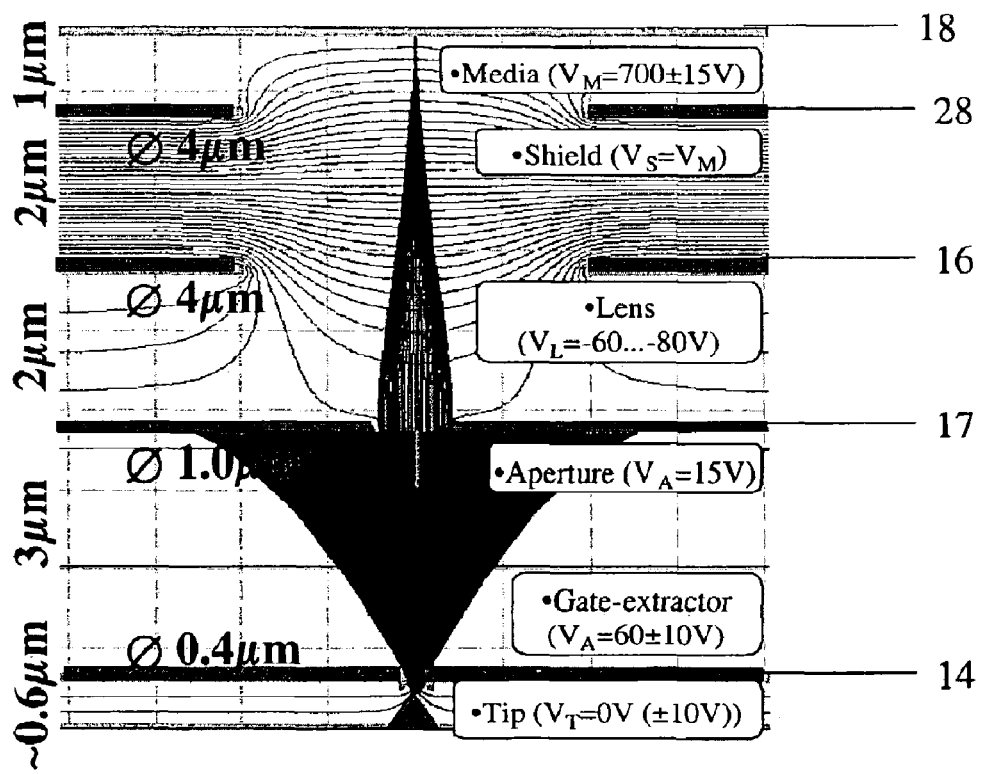
FIG. 4C is a schematic cross section side view illustrating a preferred embodiment electronic device along with exemplary parameters.
Figure 5:
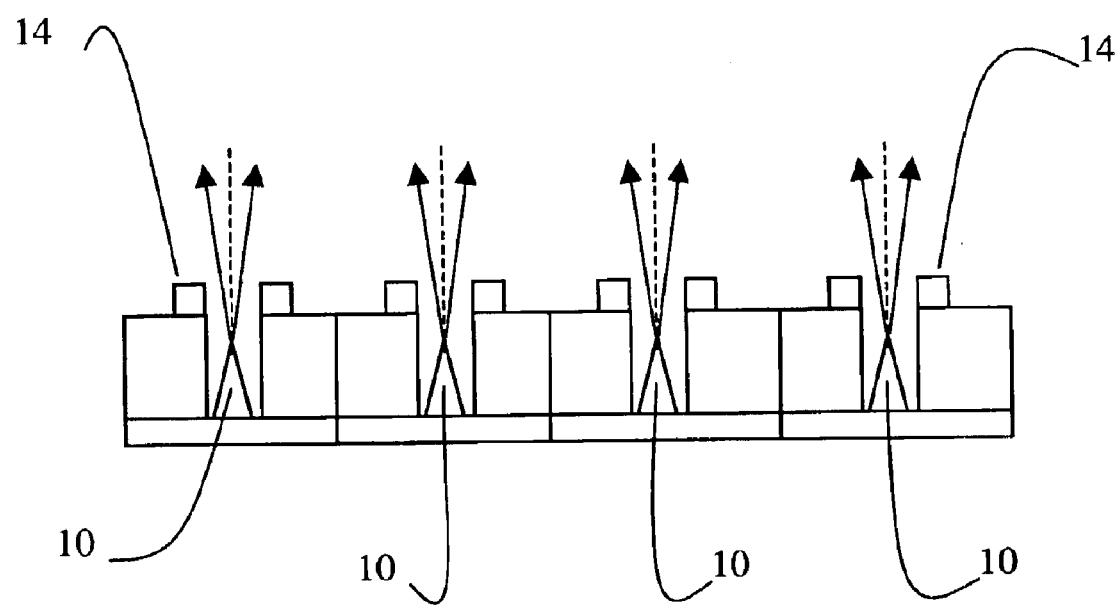
FIG. 5 is a partial schematic cross section side view of a preferred embodiment electronic device.

Another preferred method for optimizing spot size involves stabilizing emissions from the emitter 10. Through use of a feedback circuit or voltage source control circuit the voltage variation of elements in preferred embodiment electronic devices can be optimized to stabilize emissions and focus. As examples, a ballast resistor, current source or closed feedback loop may be used to limit current variation. Active control by a transistor formed under the emitter 10 that uses tip, gate and aperture current as control inputs is preferred. Tests were conducted on experimental prototypes in accordance with the FIG. 1 and FIG. 4 embodiments. An additional preferred embodiment was also tested, and is represented in FIG. 4C. The additional embodiment shown in FIG. 4C is like the embodiment in FIG. 1, but also includes a shield 28 between the lens 16 and media 18. Included on FIG. 4C, by way of example and not limitation, are field lines, voltage parameters and geometric parameters that are consistent with the invention but do not limit the invention. Limiting voltage variation in the tip emitter 10, in the aperture 17, in the lens 16, in the extractor 14, and in the medium 18 serves to improve spot size. Variation in the tip emitter should be less than or equal to ~±5V, and is preferably less than or equal to ~±2V to avoid significant impact on spot size. Variation in the wide lens 16 is preferably limited to less than or equal to ~±5V to help achieve small spot size, but this value is not essential for emission stability. Requirements for in the extractor 14 are approximately the same and preferably limited to be less than or equal to ~±2–5V. In general, tip-gate control stabilizes emissions, and gate-lens-media control improves focus stability Aperturing limits the efficiency of devices, which is somewhat offset by an extractor level collimation. However, in all of the embodiments, efficiency may be increased by replacing a single emitter with an array of emitters, i.e., each wide and distant lens 16 receives output from an array of emitters 10 and apertures 17. Each emitter will have its apertured (and preferably collimated) output formed into an emission pattern, and a plurality of the emission patterns is focused into a spot by a wide and distant lens 16. An example of this is shown in FIG. 5. Multiple emissions from emitters 10 each having the separate extractor 14 (as in FIG. 4B) are arranged to have their combined emissions apertured and focused in the central part of a wide and distant lens.

Figure 6:
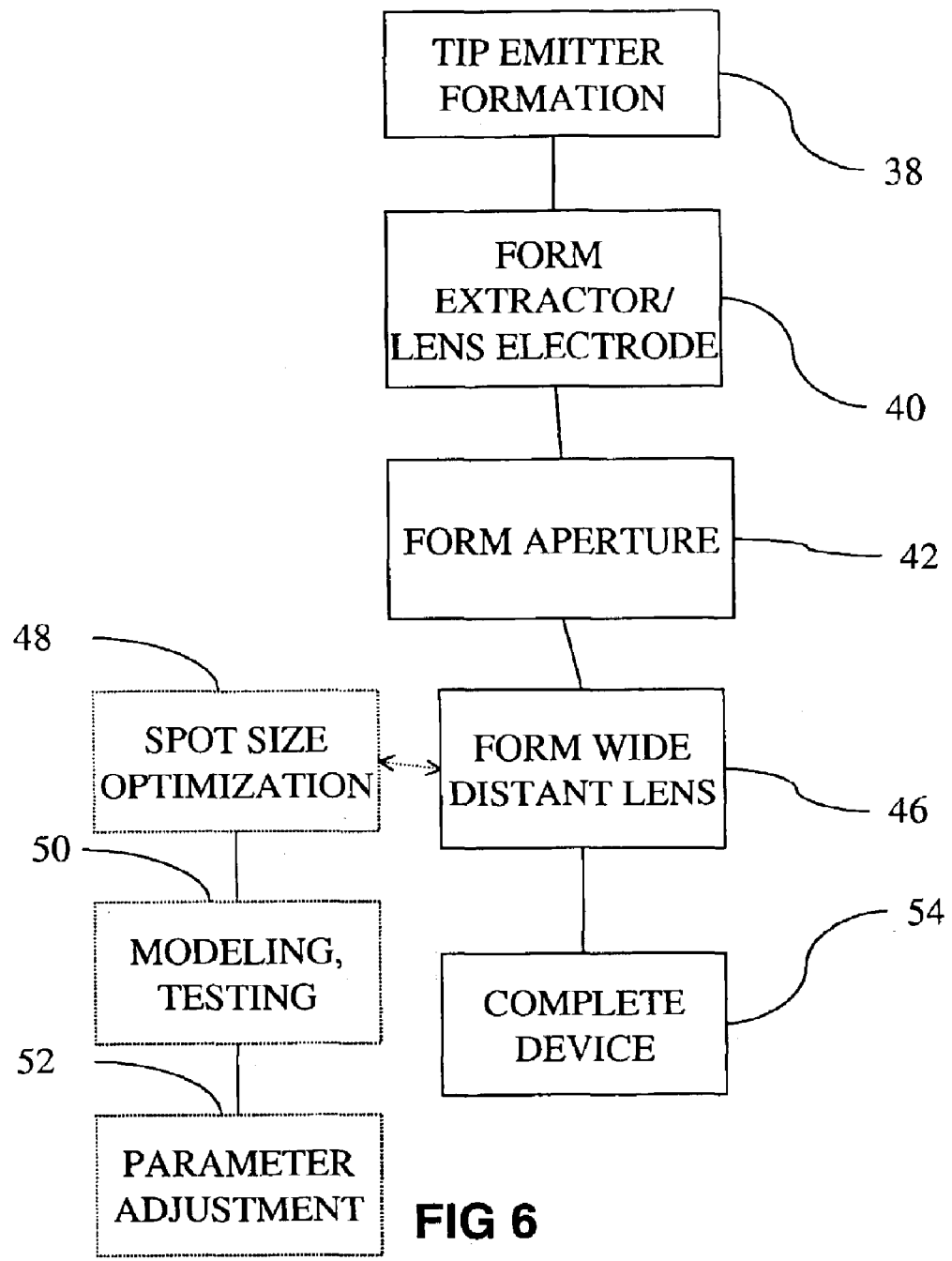
FIG. 6 illustrates a preferred method of forming an electronic device and a preferred method of reducing spot size by optimization.

The preferred embodiments illustrated above indicate a general method for reducing the spot size of a focused electron emission beam. Referring to FIG. 6, a method of reducing spot size and method of forming an electronic device of the invention are illustrated. A tip emitter is formed (step 38), preferably in a shallow aspect ratio well. As a separate step or as part of the emitter formation, an extractor layer is formed about the tip emitter (step 40), preferably with an extractor level focus electrode. An aperture is formed as a separate step (step 42). A wide and distant lens is then formed (step 46) in an independent process step from the extractor/tip/well formation, in accordance with the diameters and spacing discussed above. The wide and distant lens diameter and distance, the aperture, the extractor level lens, and relative distances (as discussed above) will affect spot size and power, and the spot size may be optimized (step 48) by adjusting any of these parameters. Optimization can include, for example, modeling and testing of prototype devices (step 50) with adjustment of various ones of the parameters (step 52). Competing goals of emission efficiency and spot size can be balanced during this process. While the diameter of the lens 16 may, in theory, be made arbitrarily wide to limit the required effect of the aperture 17, practical limits to its diameter exist, including the fact that increasing the lens' diameter will affect the number of lens/emitter device structures per unit area. Similar practical concerns exist with respect to the distances between the extractor/aperture/lens/shield/medium. A device is then completed (step 54), according to application specific conventional steps. At a minimum, a target medium 18 is arranged at a focused emission point. The type of medium and number of additional steps will depend upon the specific application. In addition, any of the steps in FIG. 6 may be carried out as part of a process that also forms other duplicate structures. Also, the steps may be carried out as part of a semiconductor device integration process, for example, the extractor and lens structures may be part of a large scale integration formation process.

Specific applications of electronic devices according to the invention will use different target media. The target medium 18 can be chosen to create different types of devices. Relative movement is created between the target medium and the focused emissions by application, for example, of a micromover to the target medium or to the wide lens/emitter structure. The target medium 18 may be a memory medium with the use of phase change material, an exemplary material being $In_2Se_3$. Other phase change materials are known to those skilled in the art. For a lithography application, an electron beam resist material is suitable, e.g., polymethylmethacrylate (PMMA). A few preferred embodiment applications will now be discussed, but are not intended to limit the invention to the particular applications.

Figure 7A:
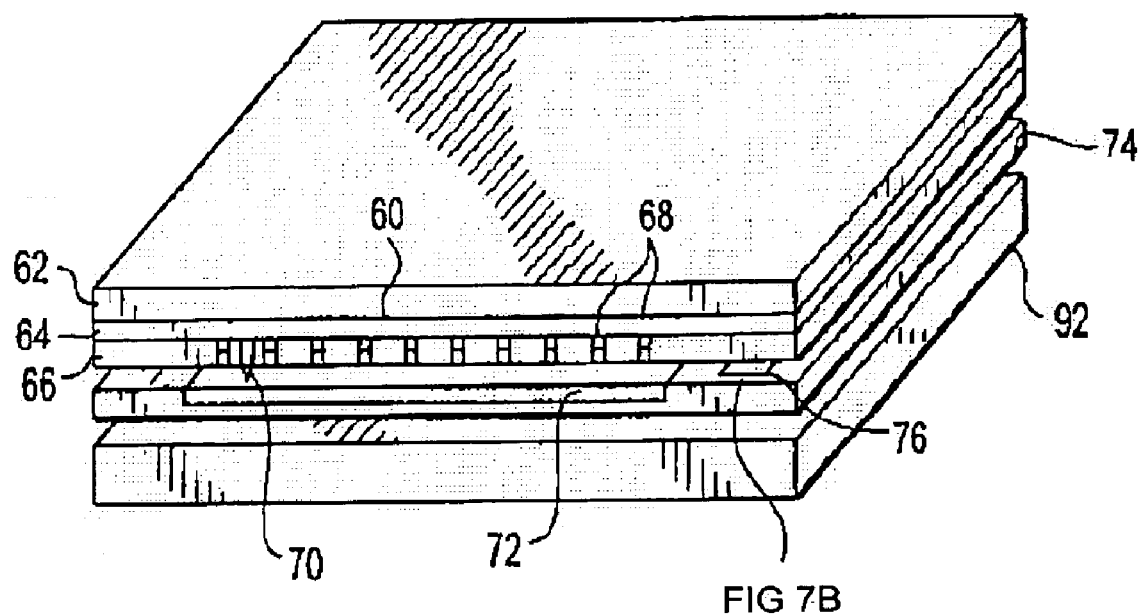
FIG. 7A is a schematic perspective view illustrating a preferred memory device of the invention.
Figure 7B:
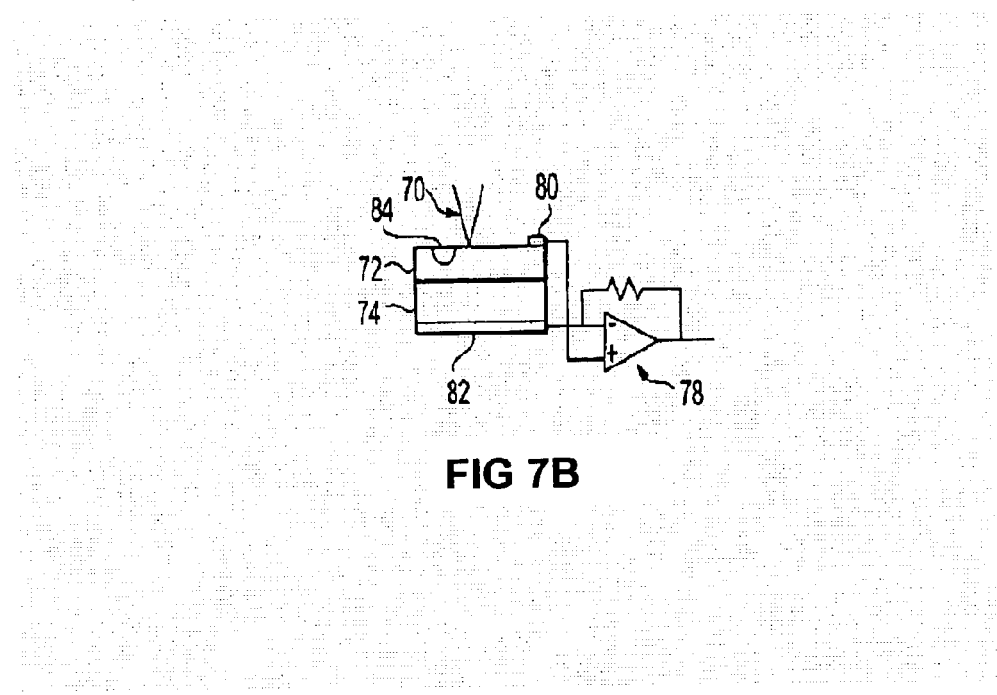
FIG. 7B illustrates a preferred embodiment reader circuit for the FIG. 7A memory device.

A preferred memory device is shown in FIGS. 7A and 7B. The embodiment generally has the FIG. 1 structure, replicated as an array of emitters and corresponding lenses. Specifically, the memory device includes a plurality of integrated tip emitters 60 formed in wells on an emitter substrate 62. The substrate 62 preferably comprises an integrated circuit (IC) including a plurality of smaller integrated emitters 60 spaced apart by a dielectric 64 from a focusing array 66 having wide and distant focusing lenses 68. Each focusing lens 68 can controllably emit a focused beam 70 that is used to affect a recording surface, namely medium 72. Medium 72 is applied to a mover 74 that positions the medium 72 with respect to the focusing lenses 68 of the focusing array substrate 66. Preferably, the mover 74 has a reader circuit 76 integrated within. The reader 76 is shown as an amplifier 78 making a first ohmic contact 80 to medium 72 and a second ohmic contact 82 to mover 74, preferably a semiconductor or conductor substrate. The mover 74 is a rotor substrate that interacts with a stator substrate 83, which contains opposing electrodes (in regard to corresponding electrodes on the mover substrate 74) for positioning the mover substrate 74 relative to the stator 92. When a focused beam 70 strikes the medium 72, if the current density of the focused beam is high enough, the medium 72 is phase-changed to create an affected medium area 84. When a low current density focused beam 70 is applied to the medium 72 surface, different rates of current flow are detected by amplifier 78 to create reader output. Thus, by affecting the medium 72 with the energy from the emitter 60, information is stored in the medium using structural phase changed properties of the medium. An exemplary phase change material is $In_2Se_3$. A preferred lithography device has the same general structure as in FIG. 7A, but omits the reader circuit and replaces the phase change material with a wafer or wafers prepared for lithographic patterning.

Figure 8:
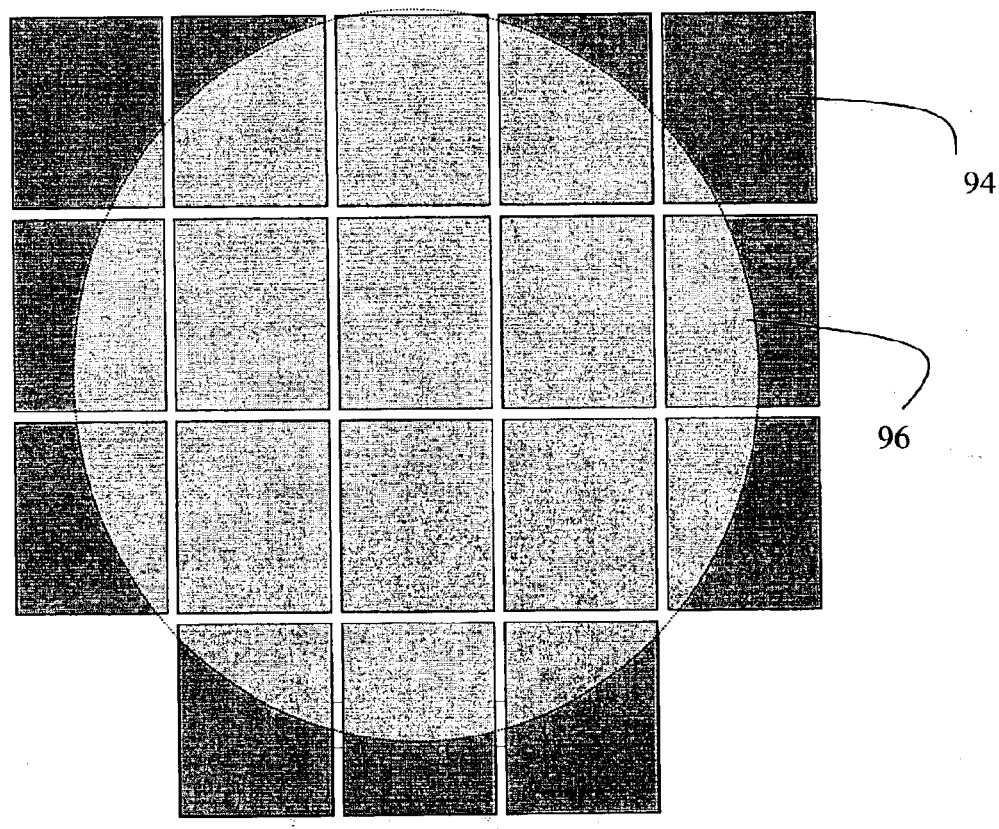
FIG. 8 is a schematic block diagram that illustrates a preferred embodiment lithography device of the invention.

FIG. 8 illustrates another preferred lithography arrangement, in which a plurality of bonded emitter chips and focusing arrays form e-beam generator arrays 94, and a wafer 96 is acted on as the target medium. Each e-beam generator array 94 has on it micromovers or nanomanipulators to position the array of beams over the correct area of the wafer 96. The wafer 92 can then be positioned underneath the arrays 94 to permit several patterns to be written. An alternative is to make emitter arrays large enough to each act on something as large as a full wafer to conduct full 6" (or larger) processing of the wafer underneath it. Another example is the use of multiple arrays having common movements to process a number of wafers in parallel, writing the same pattern to each wafer.

Figure 9:
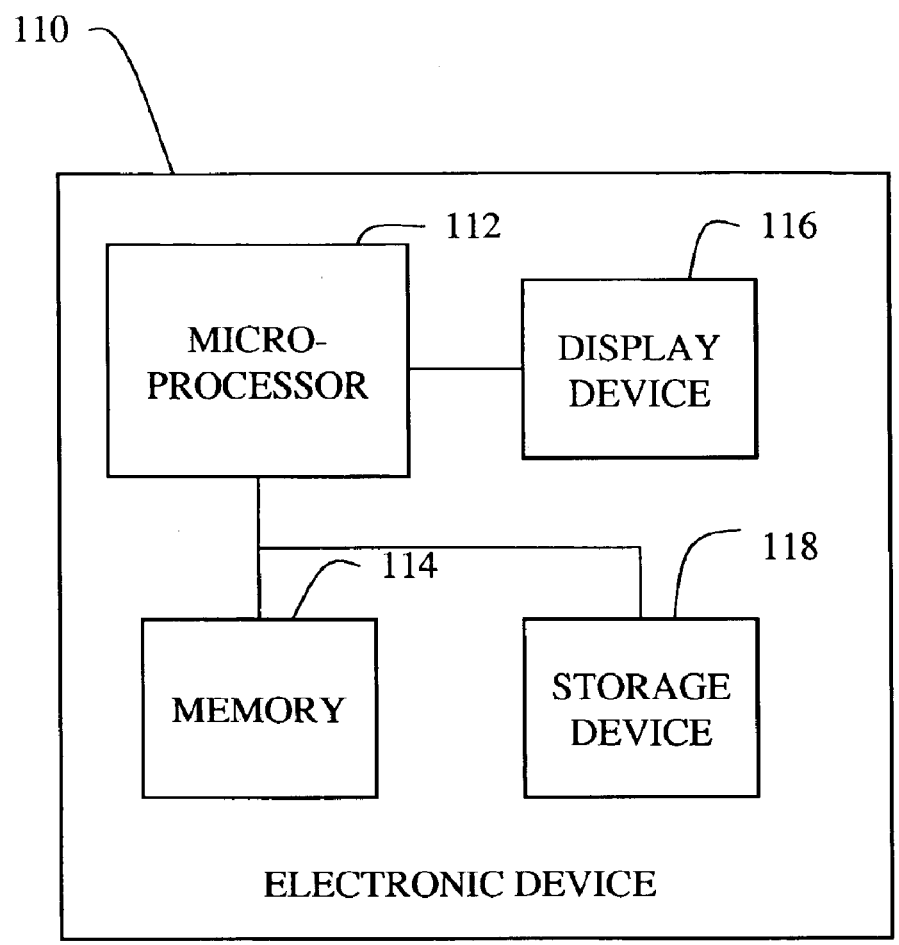
FIG. 9 is a block diagram that illustrates a preferred embodiment computer device of the invention.

FIG. 9 is an exemplary block diagram of a computer device 110, such as a computer, video game, Internet appliance, terminal, MP3 player, or personal data assistant to name just a few. The computer device 110 includes a microprocessor 112, such as an Intel Pentium Processor™ or compatible processor although other processors exist and are known to those skilled in the art. The microprocessor 112 is connected to a memory device 114 that includes computer readable memory that is capable of holding computer executable commands used by the microprocessor 112 to control data and/or input/output functions. Memory 114 can also store data that is manipulated by the microprocessor 112. The microprocessor 112 is also connected to either a storage device 116 or display device 118 or both. The storage device contains an embodiment of the invention as exemplified in earlier described figures and text showing emission devices that are focused with the wide and distant lens structure of the invention. Preferably, emitter devices of the invention are integrated on a common substrate with the microprocessor 112 and memory device 114.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An electronic device comprising:

a substrate;

a well defined in said substrate;

a tip emitter formed in said well;

an extractor disposed about said well to extract emissions from said tip emitter;

a wide lens spaced apart from said extractor for focusing said emissions through an opening defined in said wide lens, said opening having a diameter greater than a diameter of said well; and an aperture disposed between said extractor and said wide lens;

wherein said extractor level focusing means further comprises a negatively biased electrode spaced apart from said circular electrode;

wherein said extractor level focusing means comprises said extractor being formed as a circular electrode about said well; and further comprising extractor level focusing means for focusing said emissions toward said aperture.

2. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
further comprising means for stabilizing said emissions by limiting voltage variation of said extractor.

3. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
further comprising means for stabilizing said emissions by limiting voltage variation of said tip emitter to be less than or equal to ~±5V.

4. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
further comprising means for stabilizing said emissions by limiting voltage variation of said tip emitter to be less than or equal to ~±2V.

5. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
further comprising means for stabilizing said emissions by limiting voltage variation of said wide lens to be less than or equal to ~±5V.

6. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
further comprising means for stabilizing said emissions by limiting voltage variation of said wide lens to be less than or equal to ~±2V.

7. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
wherein said wide lens is spaced far enough away to focus said emission onto a medium in a spot size less than ~35 nm.

8. An electronic device within a mass storage device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
the mass storage device including a memory medium disposed at a focal point of said emissions.

9. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
wherein a width of said wide lens; is in the range of ~2–~10 $\mu$m and a width of said aperture is in the range of ~0.8–~2 $\mu$m.

10. The electronic device of claim 9, wherein a distance between said wide lens and said extractor is in the range of ~1 μm—~10 μm, and a distance between said wide lens and said aperture is at least 0.7 μm.

11. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
further comprising means for stabilizing said emissions by limiting and/or controlling voltage variation of said tip emitter.

12. The electronic device of claim 11, wherein said means for stabilizing said emissions further limits voltage variation of said aperture.

13. The electronic device of claim 12, wherein said wherein said means for stabilizing said emissions further limits voltage variation of said wide lens.

14. An electronic device comprising:
a substrate;
a well defined in said substrate;
a tip emitter formed in said well;
an extractor disposed about said well to extract emissions from said tip emitter;
a wide lens spaced apart from said extractor for focusing said emissions through an opening defined in said wide lens, said opening having a diameter greater than a diameter of said well; and
an aperture disposed between said extractor and said wide lens;
wherein said well defined in said substrate has a depth to diameter aspect ratio in the approximate range of 0.75:1–1.25:1.

15. The electronic device of claim 14, wherein said well has a depth of ~0.5 μm.

16. An electronic device within a memory device comprising:
a substrate;
a well defined in said substrate;
a tip emitter formed in said well;
an extractor disposed about said well to extract emissions from said tip emitter;
a wide lens spaced, apart from said extractor for focusing said emissions through an opening defined in said wide lens, said opening having a diameter greater than a diameter of said well; and
an aperture disposed between said extractor and said wide lens;
the memory device including a plurality of said tip emitters and comprising:
a plurality of respective wide lenses for focusing electron beams from the plurality of tip emitters to created focused beams; and
a memory medium at the focal point of the focused beams, the memory medium having a storage area being in one of a plurality of states to represent information stored in the storage area, the states being responsive to the focused beam such that an effect is generated in the storage area when the focused beam impinges upon the storage area;
a magnitude of the effect depends upon the state of the storage area; and
information in the storage area is read by measuring the magnitude of the effect.

17. The electronic device of claim 16, further comprising:
a mover to position said memory medium with respect to said plurality of tip emitters; and
a reader circuit integrated in said mover.

18. An electronic device comprising:
a substrate;
a ~0.3—~0.5 μm diameter and ~0.4—~0.6 μm deep well defined in said substrate;
a tip emitter formed in said well;
an extractor disposed about said well to extract emissions from said tip emitter;
a wide lens disposed a length of ~2—~10 μm from said extractor for focusing said emissions through an at least a ~2—~10 μm diameter opening defined in said wide lens, wherein a ratio of said diameter to said length is greater than 1:1; and
an aperture disposed between said extractor and said wide lens.

19. The electronic device of claim 18, wherein said aperture has a ~0.8—~2 μm diameter.

20. The electronic device of claim 18, wherein said wide lens has a depth in the range of ~0.1–2 μm(10 μm).

21. The electronic device of claim 18, wherein the tip emitter is one of a plurality of tip emitters formed in a respective plurality of wells, each of said plurality of emitters having a separate extractor disposed about its well, the plurality of emitters having their combined emissions focused by said wide lens and apertured by said aperture.

22. The electronic device of claim 18, wherein said aperture is disposed a length of ~0.7—~5 μm from said wide lens.

23. The electronic device of claim 22, wherein said aperture has a ~0.8–18 2 μm diameter.

24. The electronic device according to claim 18, further comprising extractor level focusing means for focusing said emissions toward said aperture.

25. The electronic device of claim 24, wherein said extractor level focusing means comprises said extractor being formed as a circular electrode about said well.

26. The electronic device of claim 24, wherein said extractor level focusing means further comprises a negatively biased electrode spaced apart from said circular electrode.

27. The electronic device of claim 18, further comprising means for stabilizing said emissions.

28. The electronic device of claim 27, wherein said means for stabilizing said emissions limits voltage variation of said extractor.

29. The electronic device of claim 27, wherein said means for stabilizing said emissions limits voltage variation of said tip emitter to be less than or equal to ~±5V.

30. The electronic device of claim 27, wherein said means for stabilizing said emissions limits voltage variation of said tip emitter to be less than or equal to ~±2V.

31. The electronic device of claim 27, wherein said means for stabilizing said emissions limits voltage variation of said wide lens to be less than or equal to ~±5V.

32. The electronic device of claim 27, wherein said means for stabilizing said emissions limits voltage variation of said extractor to be less than or equal to ~±2V.

33. The electronic device of claim 27, wherein said means for stabilizing said emissions limits voltage variation of said tip emitter.

34. The electronic device of claim 28, wherein said means for stabilizing said emissions further limits voltage variation of said aperture.

35. The electronic device of claim 34, wherein said wherein said means for stabilizing said emissions further limits voltage variation of said wide lens.

36. An electronic device, comprising:
   a substrate;
   a well defined in said substrate;
   a tip emitter formed in said well;
   an extractor disposed about said well to extract emissions from said tip emitter;
   means for limiting divergence of said emissions; and
   means for focusing said emissions into spot size of less than ~35 nm.

37. The electronic device of claim 36, further comprising means for collimating said emissions toward said means for focusing.

38. The electronic device of claim 36, wherein the tip emitter is one of a plurality of tip emitters formed in a respective plurality of wells, each of said plurality of emitters having a separate extractor disposed about its well, the plurality of emitters having divergence of their combined emissions limited by said means for limiting divergence and focused by said means for focusing.

39. The electronic device of claim 36, wherein said means for focusing and said means for limiting divergence are formed independently from said well, said tip emitter and said extractor.

40. The electronic device of claim 39, wherein said means for focusing comprises an electrostatic lens that has a diameter greater than a diameter of said well.

41. The electronic device of claim 40, wherein said means for limiting divergence comprises an aperture disposed between said extractor and said electrostatic lens, said aperture further being spaced apart from said electrostatic lens.

* * * * *

UNITED STATES PATENT AND TRADEMARK OFFICE
CERTIFICATE OF CORRECTION

PATENT NO. : 6,891,185 B2
APPLICATION NO. : 10/603445
DATED : May 10, 2005
INVENTOR(S) : Govyadinov et al.

It is certified that error appears in the above-identified patent and that said Letters Patent is hereby corrected as shown below:

Col. 10 (line 15), delete "wide lens" and insert therefor --extractor--.

Col. 12 (line 40), delete "~0.8-18 2µm" and insert therefor -- ~0.8 - ~2µm--.

Col. 13 (line 4), delete "claim 28," and insert therefor --claim 33,--.

Signed and Sealed this

Twenty-eighth Day of November, 2006

JON W. DUDAS
*Director of the United States Patent and Trademark Office*